US006385293B1

(12) United States Patent
Wandke et al.

(10) Patent No.: US 6,385,293 B1
(45) Date of Patent: May 7, 2002

(54) THERMALLY EQUALIZED X-RAY TUBE BEARING

(75) Inventors: Norman E. Wandke, Naperville; Mark S. Maska, Palatine; Donald C. Mueller, Aurora, all of IL (US)

(73) Assignee: Philips Medical Systems (Cleveland), Inc., Highland Heights, OH (US)

( * ) Notice: Subject to any disclaimer, the term of this patent is extended or adjusted under 35 U.S.C. 154(b) by 0 days.

(21) Appl. No.: 09/501,441

(22) Filed: Feb. 10, 2000

(51) Int. Cl.[7] ............................................... H01J 35/10
(52) U.S. Cl. ....................................... 378/131; 378/132
(58) Field of Search .................................. 378/125–130

(56) References Cited

U.S. PATENT DOCUMENTS

| | | | |
|---|---|---|---|
| 4,413,355 A | 11/1983 | Matsumoto | 378/127 |
| 4,674,109 A | * 6/1987 | Ono | 378/144 |
| 5,090,041 A | 2/1992 | Furbee | |
| 5,150,398 A | 9/1992 | Nishioka et al. | 378/132 |
| 5,224,142 A | 6/1993 | Ono et al. | |
| 5,384,818 A | 1/1995 | Ono et al. | |
| 5,553,114 A | 9/1996 | Siemers et al. | |
| 5,875,227 A | 2/1999 | Bhatt | 378/132 |

FOREIGN PATENT DOCUMENTS

JP        02144836        6/1990

* cited by examiner

*Primary Examiner*—Craig E. Church
(74) *Attorney, Agent, or Firm*—Fay, Sharpe, Fagan, Minnich & McKee, LLP

(57) ABSTRACT

A high energy x-ray tube includes an evacuated chamber (12) containing a rotor (34) which rotates an anode (10) in the path of a stream of electrons (A) to generate an x-ray beam (B) and heat. Heat is carried away from the anode to a bearing shaft (54) which rotates relative to a stationary rotor (42) on forward and rear lubricated bearings (44P, 44R). The heat is directed away from the forward bearings (44F), by a core (70) of a thermally conductive material, such as copper, disposed in a central cavity (60) within the shaft. Annular insulating regions (74,76) are optionally defined between the core and the bearing shaft adjacent the races to increase the thermal path between the anode and the races. The reduction in temperature of the forward bearings results in a decrease in the evaporation rate of the lubricant (46) and a corresponding increase in the lifetime of the x-ray tube.

18 Claims, 5 Drawing Sheets

$T_i - 273$ K
EVAPORATION

THERMALLY EQUALIZED X-RAY TUBE BEARING

BACKGROUND OF THE INVENTION

The present invention relates to the medical diagnostic arts. It finds particular application in connection with reducing the temperature at the forward bearing race of the bearing shaft of an x-ray tube rotor and will be described with particular reference thereto. It should be appreciated, however, that the invention is also applicable to dissipation of heat in other vacuum systems.

A high power x-ray tube typically includes a thermionic filament cathode and an anode which are encased in an evacuated envelope. A heating current, commonly on the order of 2–5 amps, is applied through the filament to create a surrounding electron cloud. A high potential, on the order of 100–200 kilovolts, is applied between the filament cathode and the anode to accelerate the electrons from the cloud towards an anode target area. The electron beam impinges on a small area of the anode, or target area, with sufficient energy to generate x-rays. The acceleration of electrons causes a tube or anode current on the order of 5–600 milliamps. Only a small fraction of the energy of the electron beam is converted into x-rays, the majority of the energy being converted to heat which heats the anode white hot.

In high energy tubes, the anode rotates at high speeds during x-ray generation to spread the heat energy over a large area and inhibit the target area from overheating. The cathode and the envelope remain stationary. Due to the rotation of the anode, the electron beam does not dwell on the small impingement spot of the anode long enough to cause thermal deformation. The diameter of the anode is sufficiently large that in one rotation of the anode, each spot on the anode that was heated by the electron beam has substantially cooled before returning to be reheated by the electron beam.

The anode is typically rotated by an induction motor. The induction motor includes driving coils, which are placed outside the glass envelope, and a rotor with an armature and a bearing shaft, within the envelope, which is connected to the anode. When the motor is energized, the driving coils induce electric currents and magnetic fields in the armature which cause the armature and other portions of the rotor to rotate.

The temperature of the anode can be as high as 1,400° C. Part of the heat is transferred to the rotor, including the armature and the bearing shaft. Heat travels through the bearing shaft to the bearing races and is transferred to the lubricated bearing balls in the races. The lubricants on the bearing balls become hot and tend to evaporate.

Because x-ray tubes operate in a vacuum requiring low vapor pressure materials, standard petroleum based lubricating compounds cannot be used. Thus, it is common in the industry to use solid metal lubricants, such as lead, on the bearing races. The evaporation of lead lubricant from a bearing race accelerates rapidly over 350° C. These temperatures can be reached in the bearing, primarily during processing, and also during field life. The evaporation of lubricant leads to a rapid degradation of the bearing surfaces and premature tube failure. In an x-ray tube, the front bearing race is physically closer to the hot target than the rear bearing. Because of this, the front bearing runs about 100 C. hotter than the rear bearing and fails at a much higher rate than the rear bearing.

To reduce lubricant evaporation, silver lubrication on the ball bearings is sometimes used in place of lead. Silver has a lower vapor pressure than lead and can be run at least 100 C. hotter than lead. However, silver lubrication has a number of drawbacks. It tends to react with the bearing steel if it becomes too hot and causes grain boundary cracking and premature failure of the bearing. Additionally, silver requires more starting and running torque than lead, due to its lower lubricity. The torque imparts more residual heat into the bearing, through frictional and eddy current induction heating of the bearing and surrounding rotor body components. Silver lubricating material also creates more noise during operation than lead.

The present invention provides a new and improved x-ray tube and rotor and method of operation which overcome the above-referenced problems and others.

SUMMARY OF THE INVENTION

In accordance with one aspect of the present invention, a high energy x-ray tube for providing a beam of x-rays is provided. The tube includes an envelope which defines an evacuated chamber. A cathode is disposed within the chamber for providing a source of electrons. An anode is disposed within the chamber and is struck by the electrons to generate x-rays. A rotor is provided for rotating the anode relative to the cathode. The rotor includes a rotor core having a high thermal conductivity such that heat is conducted by the core away from the anode, and a forward bearing race of a lower conductivity than the core, such that the core conducts heat past the forward bearing race. Lubricated bearings are received in the forward bearing race.

In accordance with another aspect of the present invention, a rotor for an x-ray tube is provided. The rotor includes a bearing member including a hollow cylindrical shaft formed from a material of a first thermal conductivity, the cylindrical shaft defining forward and rear bearing races on an exterior surface thereof to receive lubricated bearings therein. A neck is connected with the bearing member, adjacent the forward bearing races, to connect the rotor to an anode of the x-ray tube. An insert, received within the hollow shaft, and formed from a material of a second thermal conductivity, which is higher than the first thermal conductivity, transports heat away from the forward bearing race and reduces the temperature of the forward bearing race during operation of the x-ray tube.

In accordance with another aspect of the present invention, a method of reducing evaporation of a bearing lubricant in an x-ray tube having an anode and a rotor assembly connected therewith is provided. The rotor assembly includes a forward bearing race and a rear bearing race, the forward bearing race being closer to the anode than the rear bearing race. The method includes conducting heat around and past the forward bearing race toward the rear bearing race.

One advantage of the present invention resides in a reduction in operating temperature of the forward bearing of an x-ray tube bearing shaft.

Another advantage of the present invention is that the evaporation rate of the lubricant for the bearing balls is reduced.

Another advantage of the present invention is an increased life of the bearings and the tube.

Another advantage of the present invention is that it enables the use of lead as a bearing ball lubricant.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment, and are not to be construed as limiting the invention.

DETAILED DESCRIPTION OF THE PREFERRED EMBODIMENT

Figure 1:
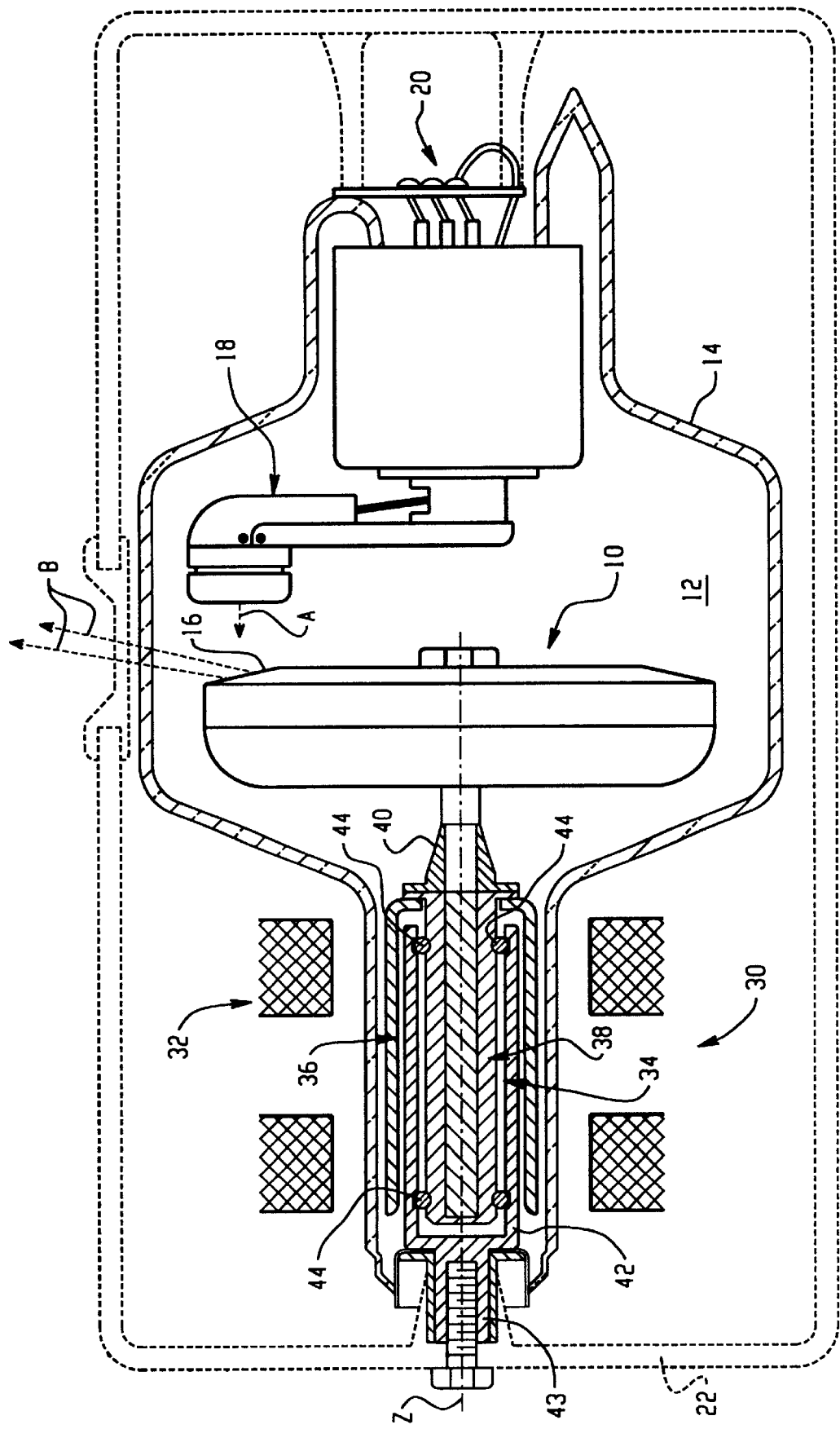
FIG. 1 is a schematic view of a rotating anode tube according to the present invention.

With reference to FIG. 1, a rotating anode x-ray tube of the type used in medical diagnostic systems for providing a focused beam of x-ray radiation is shown. The tube includes a rotating anode 10 which is operated in an evacuated chamber 12 defined typically by a glass envelope 14. The anode is disc-shaped and beveled adjacent its annular peripheral edge to define an anode surface or target area 16. A cathode assembly 18 supplies and focuses an electron beam A which strikes the anode surface 16.

Filament leads 20 lead in through the glass envelope to the cathode assembly to supply an electrical current to the assembly. When the electron beam strikes the rotating anode, a portion of the beam is converted to x-rays B which are emitted from the anode surface and a beam of the x-rays passes out of the tube through the envelope 14 and a window of a surrounding cooling oil enclosure or housing 22.

An induction motor 30 rotates the anode 10. The induction motor includes a stator having driving coils 32, which are positioned outside the glass envelope, and a rotor 34, within the envelope, which is connected to the anode 10. The rotor includes an outer, cylindrical armature or sleeve portion 36 and an inner bearing member 38, which is centrally aligned within the armature. The armature 36 and bearing member 38 are connected to the anode by a neck 40 of molybdenum or other suitable material. The armature 36 is formed from a thermally and electrically conductive material, such as copper. When the motor is energized, the driving coils 32 induce magnetic fields in the armature which cause the armature and bearing member to rotate relative to a stationary, cylindrical rotor support 42, which is axially aligned with the armature and bearing member and is positioned therebetween. The rotor support is connected, at a rearward end, by a mounting assembly 43 with the housing 22, which extends outside the envelope 14 for rigidly supporting the rotor bearing.

Figure 2:
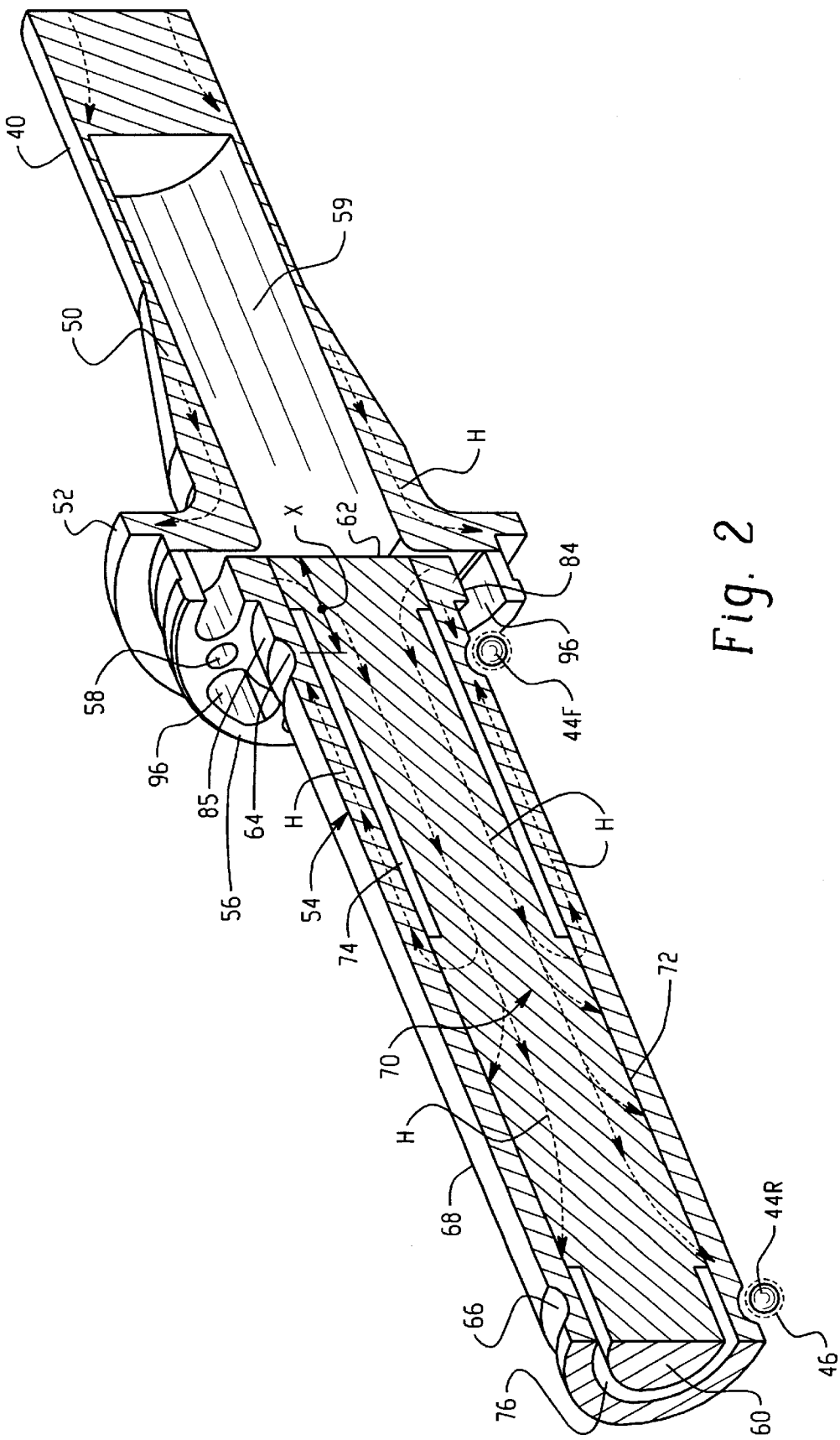
FIG. 2 is an enlarged sectional perspective view of a bearing member and neck of the x-ray tube of FIG. 1.

With reference also to FIG. 2, bearings 44, such as ball or roller bearings, positioned between the bearing member 38 and the rotor support 42, allow the bearing member, armature 36, and anode 10 to rotate smoothly, relative to the rotor support 42. The bearing balls are coated with a lubricant 46 (not to scale), such as lead or silver at a thickness of about 1000–3000 Å. Preferably the x-ray tube includes both forward and rear bearing balls 44F and 44R, respectively.

As used herein, the terms "forward," "rear," and the like, are used to define relative positions of components along an axis Z passing through the bearing member 38 and anode 10. Components which are described as forward are closer to the anode, while components described as rearward are further from the anode.

The neck 40 includes a stem portion 50 and a flange 52 which extends radially from a rearward end of the stem portion for connecting the neck with the bearing member and the armature. The bearing member 38 includes a generally cylindrical shaft 54 and an annular hub 56, which extends radially from the shaft at the neck end of the bearing member and includes suitably positioned apertures 58.

Fixing members (not shown), such as screws or bolts, connect the bearing member hub 56 and armature 36 with the neck flange 52 via the apertures.

The stem portion 50 of the neck defines a hollow, interior cavity 59 with an opening adjacent the flange 52 such that heat traveling through the neck from the anode enters the bearing primarily through the neck flange 52 and bearing hub 56, as shown by the heat flow arrows H in FIG. 2. Heat also flows into armature 36 (not shown in FIG. 2). The stem cavity 59 reduces the cross sectional area through which heat flows as compared with a solid stem. The rate of heat flow is dependent on the cross sectional area, and thus a reduction in the cross sectional area reduces the rate of heat flow to the bearing shaft.

The x-ray tube bearing shaft 54 defines an interior, cylindrical cavity or bore 60, which extends axially into the shaft from the hub end, at least part-way along the shaft, with an opening 62, adjacent the hub or forward end of the shaft. The bearing shaft cavity 60 is preferably formed by boring out up to approximately 70% of the shaft internal diameter. If too much material is taken out, however, the bearing shaft will not be sufficiently rigid to withstand the loads placed on the bearing member. This could lead to premature bearing member failure. Other methods of forming the cavity are also contemplated, including molding the shaft with a cavity.

Forward and rear bearing races 64 and 66, respectively, are defined in an outer cylindrical surface 68 of the shaft 54. The forward bearing race is closest to the anode 10. The bearing races comprise annular recesses or grooves in the bearing shaft with a semicircular cross section for receiving the forward and rear bearing balls 44F and 44R, respectively.

A generally cylindrical core or insert 70, is received within the bearing cavity 60 and makes thermal contact with at least a portion of an interior, cylindrical surface 72 of the bearing shaft 54. The core 70 is made from a material with a high thermal conductivity (i.e., a conductivity higher than that of the bearing shaft material). The bearing shaft is formed from a material which has a relatively low thermal conductivity, such as tool steel. Rex20™ is a commonly used tool steel for bearing shafts and may be used for the hollow bearing shaft 54.

Heat, therefore, flows preferentially through the high conductivity core 70. As shown in FIG. 2, heat enters the core adjacent the bearing hub 56 and flows along the core toward the rearward end of the shaft 54, adjacent the rear bearing race 66. This has the effect of transferring heat from the front race 64 to the rear race, reducing the temperature at the front race, while increasing the temperature of the rear race somewhat. Since the temperature of the rear race is still at a lower temperature than the forward race, the temperature of the forward race governs the x-ray tube lifetime (time to x-ray tube failure due to complete evaporation of lubricant from the forward bearing balls). Accordingly, an increase in the rear bearing race temperature does not have a significant effect on tube lifetime.

One suitable core 70 is made from copper, although other thermally conductive materials are also contemplated. Copper provides several advantages over many other thermally conductive materials. First, it has a high thermal expansion coefficient relative to the tool steel commonly used in the manufacture of bearing shafts. This difference in expansion coefficient causes the copper core to expand within the bearing cavity 60, when heated during operation of the x-ray tube, ensuring good contact, and thus low thermal contact resistance, between the bearing shaft 54 and the core 70. This enhances heat transfer between the bearing and the core. Copper also has a low vapor pressure, making it suitable for use in the high vacuum conditions of the x-ray tube. Other suitable materials for forming the core include silver and beryllium. The core 70 preferably has a very finely finished outer surface to decrease the contact resistance between the core and the bearing shaft interior surface 72.

Figure 3:
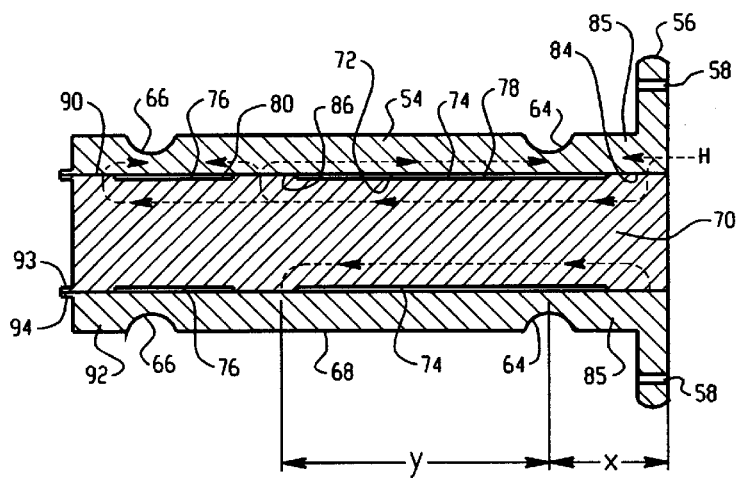
FIG. 3 is an enlarged sectional view of the bearing shaft and core of FIG. 2.

With reference also to FIG. 3, in a preferred embodiment, the core 70 includes one or more relief cuts or grooves 74, 76. The grooves 74, 76 may be formed by machining portions of the outer surface of the core to create a cylindrical indent. The relief grooves 74, 76 each define a annular space 78, 80, respectively, between the core and the interior surface 72 of the shaft. The space is evacuated during the initial evacuation of the x-ray tube-envelope, creating an insulation space of low thermal conductivity which resists the transfer of heat between the core and the bearing shaft. The length and position of the grooves 74, 76 define the location and dimensions of annular, thermal contact areas or pads 84, 86 where the core and the bearing shaft are in thermal contact. The conductive heat transfer between the bearing shaft and the core primarily occurs at these contact areas. By selecting the position and length of the grooves, the heat may be transferred along the core for a selected distance before the heat is able to return to the bearing shaft. In this way the temperature difference between the front and the rear bearing races is reduced and, preferably, balanced.

FIG. 3 shows two grooves 74 and 76, although fewer or ore grooves could also be employed. The forward groove 74 extends rearwardly along the core 70 from slightly forward of the front race 64. This creates a forward contact area 84, adjacent the hub 56 and forward of the front race 64. The heat flows rearwardly from the neck 40 into the bearing shaft 54 and a significant portion of the heat flows into the core 70 via the forward contact area 84. This flow of heat into the core reduces the amount of heat flowing through a forward portion 85 of the bearing shaft, between the hub and the front race, directly to the front race 64. A significant proportion of the heat thus flows through the core towards the rear contact area 86, which is located at the end of the forward groove, and considerably rearward of the front race. Some of the heat entering the shaft via the second contact area 86 travels forward along the bearing shaft to the first race 64, and some travels rearward along the bearing shaft to the rear race 66.

As can be seen from FIG. 3, the core 70 increases the path length for a portion of the heat to travel through the shaft 54 to the reach the front bearing race 64, and, at the same time, reduces the path length for the heat to travel through the shaft to the rear bearing race. Thus, the heat is distributed more evenly between the two races. In a conventional bearing shaft, the heat entering the bearing shaft has a relatively short distance x to travel to reach the front race. In the bearing member of FIG. 3, at least a portion of the heat entering the shaft from the stem travels along the core and reenters the bearing shaft a distance y from the front bearing race, which is longer than distance x. Since the temperature of a point along the bearing shaft is dependent on the cross sectional area and the distance traveled by the heat, the added distance 2y-x results in a decrease in temperature at the front bearing race. In contrast, with a conventional solid core of tool steel, rather than the thermally conductive core of the present invention, the heat travels progressively through the shaft, heating the front race to a much higher temperature than the rear race, because of the closer proximity, and shorter path length, from the anode 10 to the front race 64.

In an alternative embodiment, the grooves are filled with a material having low thermal conductivity (i.e., lower than that of the bearing shaft), such as ceramic.

In another alternative embodiment, the contact pads 84, 86 are formed by encircling the core with washers or other suitable spacers, rather than by cutting out grooves in the core. The washers are preferably welded to the core to maintain good thermal contact with the core. The washers are preferably thermally conductive, although low conductivity materials, such as tool steel may also be used, which are, nevertheless, more conductive than the vacuum which develops in the adjacent groove spaces 78, 80. Alternatively, the contact pads and grooves may be formed by machining the bearing shaft inner surface 72, or by welding washers or spacers to the shaft inner surface.

The second, rear groove 76 is optionally positioned adjacent the rear race 66. The rear groove causes a portion of the heat flowing through the core 70 to travel rearward of the rear groove and enter the bearing shaft 54 through a third contact area 90 defined rearwardly of the rear race. This has the effect of causing some of the heat flowing through the core to heat a rear portion 92 of the bearing shaft 54, rearward of the rear race, and thus reduces the amount of heat reaching the rear race.

The width and length of the grooves 74, 76 and the length of the contact areas 84, 86, 90 can be adjusted to optimize the transfer of heat from the front race to the rear race and reduce the temperature difference between the front and rear race. Fewer, or more grooves and contact areas may be provided to optimize the heat distribution along the bearing shaft 54. In this way, the bearing temperature is adjustable to customize the performance characteristics of the x-ray tube.

To maintain the core 70 firmly positioned within the bearing shaft cavity, the core is preferably welded to the shaft 54. As shown in FIG. 3, the core includes an annular, rearwardly extending welding rim 93 at its rearward end. The bearing shaft has a corresponding welding rim 94. With the core in position in the bearing shaft cavity, the two rims 93, 94 are welded together to create a weld joint. Although this is a convenient method for welding the core to the bearing shaft, other methods are also contemplated.

In an alternative embodiment, the core 70 is cast directly into the bearing shaft cavity 60. In this embodiment, the bearing shaft 54 is bored out and filled with a molten metal for forming the core, such as molten copper. The molten copper is allowed to cool under pressure, forming the core. This method results in good thermal contact between the core and the bearing shaft, but does not readily facilitate formation of grooves.

With reference once more to FIG. 2, the bearing hub 56 optionally includes several bores 96 therethrough to provide a spoked hub. The bores preferably result in removal of approximately 10–30% of the mass of the hub. The decrease in cross sectional area of the hub resulting from the removal of material increases the thermal resistance through the hub and adjacent forward portion 85 of the bearing shaft, without appreciably reducing the strength of the hub. The spoked bearing hub, in combination with a copper core, results in a reduction in the temperature of the forward bearing race by about 40° C. This can reduce bearing lubricant evaporation by a factor of four during processing.

Figure 4:
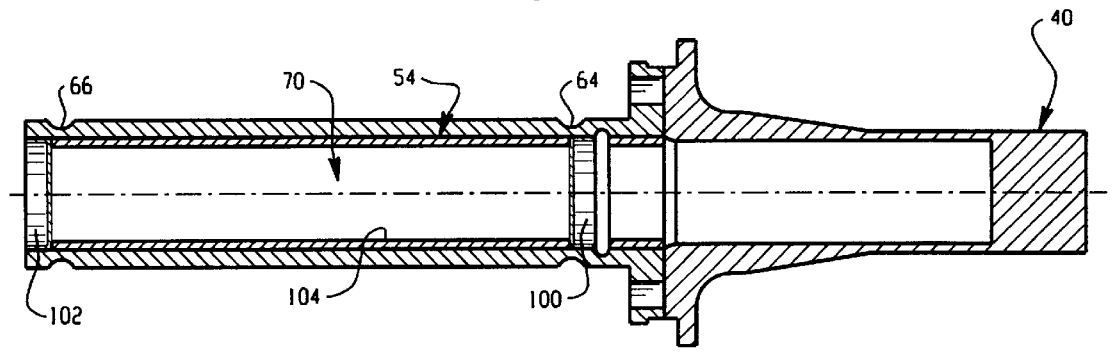
FIG. 4 is an enlarged side sectional view of an alternative embodiment of a bearing shaft, core, and neck according to the present invention.

With reference also to FIG. 4, in another alternative embodiment, the core 70 is formed from a material which is liquid at the operating temperatures of the x-ray tube or at ambient temperature. Suitable liquid cores include mercury, gallium, and gallium-indium-tin mixed alloy compositions. The liquid material for the core is poured or otherwise introduced to the bearing cavity 60. The forward end of the cavity is then sealed with an end cap or plug 100 to prevent leakage of the liquid metal core. Any leakage of the metal during operation of the x-ray tube could result in evaporation of the metal into the x-ray tube vacuum and shortened operational life. Thus, the plug is preferably tightly sealed through welding. A rear end of the bearing cavity is plugged with a similar end cap or plug 102 prior to introduction of the liquid metal. Alternatively, the bearing shaft is not fully bored out along its length, leaving a portion at the rear end which acts as the plug.

While liquid metals, such as mercury, tend to have lower thermal conductivity than copper, silver, and some other solid metals, they can ensure very good contact between surfaces. Thus, a good thermal contact between the bearing shaft 54 and the liquid core 70 compensates, to some extent, for the reduction in thermal conductivity of the core.

Optionally, surface treatment of the interior surface 72 of the shaft, such as plating with a corrosion-resistant material, is used to inhibit corrosion by corrosive, liquid metals. FIG. 4 shows the inner surface of the bearing shaft coated with a thin layer of corrosion resistant material 104 (not to scale). The material 104 should also be thermally conductive. Nickel is a suitable corrosion-resistant material.

Figure 5:
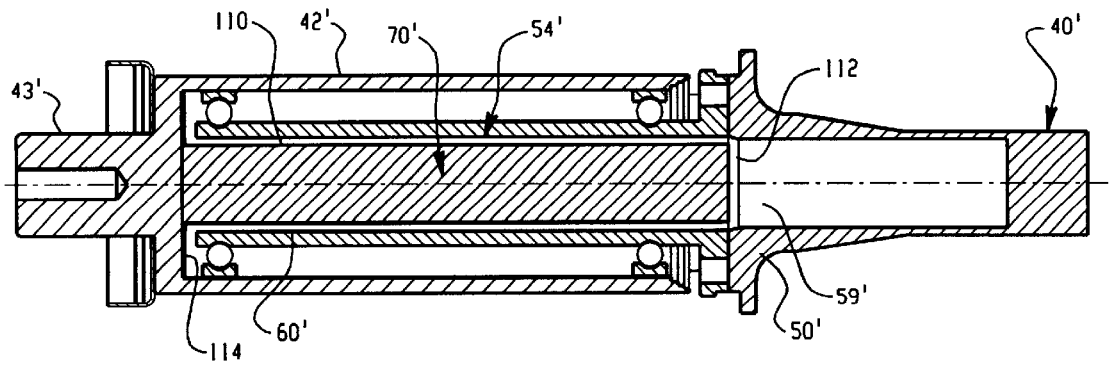
FIG. 5 is a second alternative embodiment of a bearing shaft, core, and neck according to the present invention.

In an alternative embodiment, shown in FIG. 5, a core 70' is integral with the x-ray tube mounting 43'. Specifically, the core extends forwardly from the mounting and is received by a hollow bearing shaft 54'. The core may be welded or otherwise attached at its rearward end to the mounting. In this embodiment, the core 70' remains stationary, with the rotor support 42' and mounting, while the bearing shaft 54' rotates relative to the core.

The core is of a slightly smaller diameter than the internal diameter of the bearing shaft cavity 60' so that a narrow vacuum gap 110 (not shown to scale) is defined between the core and the bearing shaft during operation. The core 70' may be formed with grooves, as for the core 70 of FIGS. 1–4, the grooves being wider than the vacuum gap 110.

During operation of the x-ray tube, heat is transferred to the core 70' from the hollow bearing shaft 54', through the narrow vacuum gap 110. The heat is transferred from the core to the mounting 43' and housing and thus will be passed outside the envelope, to a cooling oil, which fills the housing. By cooling the oil, the core is also cooled. Optionally, a welded end cap 112, positioned at the rearward end of the stem cavity 59', or at the forward end of the bearing shaft cavity, keeps the forward end of the core from moving out of the bearing shaft cavity and into the stem cavity. The core is thereby positioned to maintain an annular gap 114 between the rearward end of the bearing shaft 54' and the mounting 43'.

Figure 6:
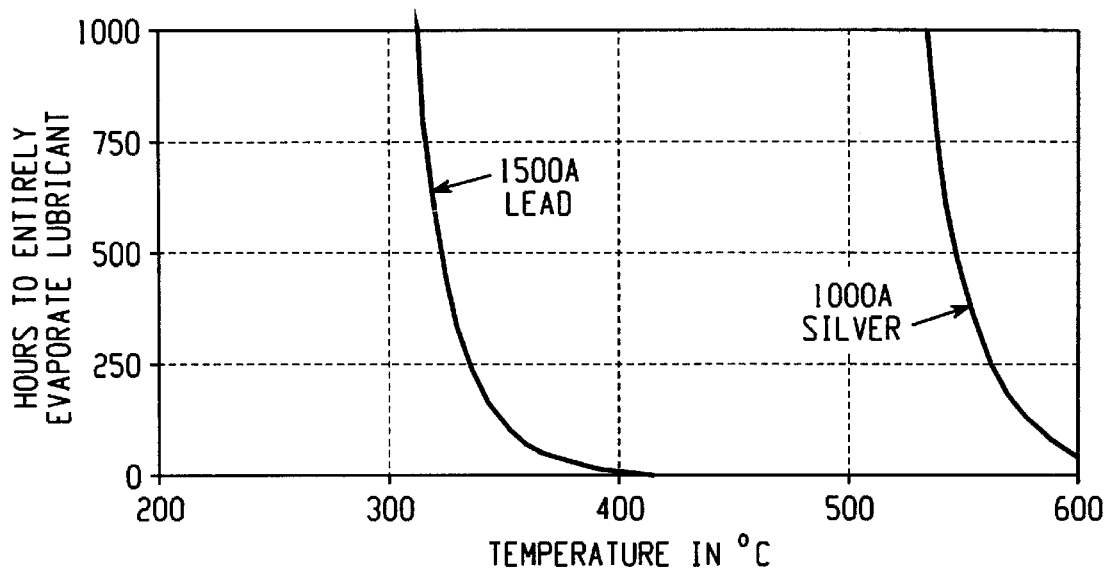
FIG. 6 is a plot of hours to entirely evaporate bearing lubricant from a bearing ball versus the temperature of the lubricant calculated for lead and silver lubricants.

With reference to FIG. 6 a plot of life of bearing lubricant with operating temperature is shown for two bearing lubricants, lead and silver. As shown in FIG. 6, there is an exponential decline in lubricant life (expressed as hours to entirely evaporate the lubricant) with increasing temperature. Thus, it can be seen that significant improvements in lubrication lifetime may be achieved by reducing the temperature of the front bearing race by only a few degrees, even if the rear bearing temperature is increased by an equivalent amount. For example, for a lead bearing, a temperature reduction from 350° C. to 320° C. (i.e., a 30° C. drop in temperature) increases bearing lubrication life from less than 150 hours to 750 hours and a 40° C. drop to 310° C. increases the lifetime to 1000 hours.

Figure 7:
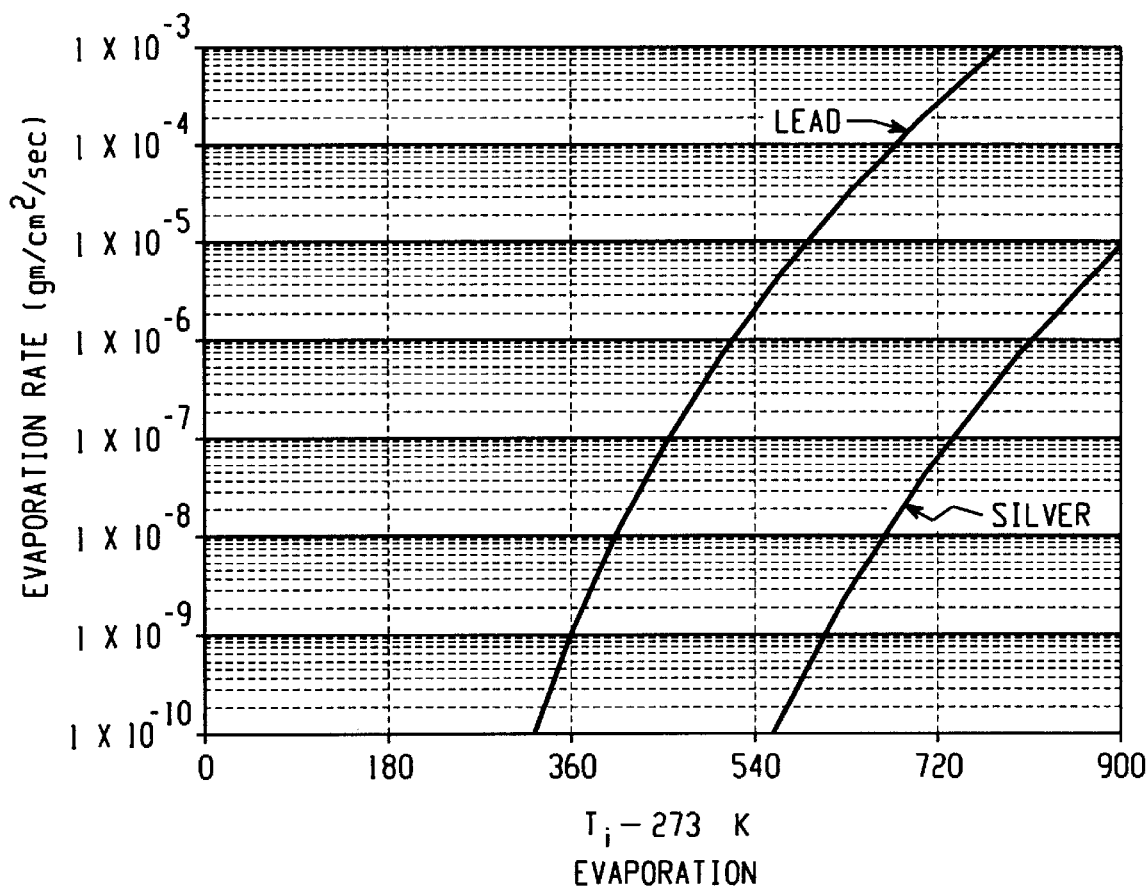
FIG. 7 is a plot of evaporation rate of lubricant versus temperature calculated for lead and silver lubricants.

FIG. 6 was derived from calculations of the evaporation rates (in grams/square centimeter/second), shown in FIG. 7. The hours H to evaporate the lubricant (silver or lead) at temperature $T_i$ (degrees K) were calculated by multiplying the evaporation rate measured by the lubricant available, as follows:

$$H = \frac{M}{E_i \times F \times 3600} \tag{1}$$

where

F is the area of lubricant surface exposed in cm$^2$ $E_i$ is the evaporation rate of the lubricant at temperature $T_i$ in gm/cm$^2$/sec M is the mass of the lubricant in gm The evaporation rates were calculated as follows:

Surface area F of a bearing ball of radius $r=4\pi r^2$

For a ball of radius 0.125 inches (0.3175 cm), the surface area F is 1.267 cm$^2$.

The initial weight $M_0$ of lubricant applied to each ball is approximately:

$$M_0 = F \times t \times \rho \tag{2}$$

where t is the thickness of lubricant applied in cm $\rho$ is the density of the lubricant in gm/cm$^3$ If the thickness t of the lubricant applied is 1500 Å (lead) or 1000 Å (silver), and the density $\rho$ of lead and silver are 11.34 gm/cm$^3$ and 10.500 gm/cm$^3$, respectively.

Then, for lead, $M_0 = 2.155 \times 10^{-4}$ g and for silver, $M_0 = 1.33 \times 10^{-4}$ g Evaporation rates $E_i$ for lead and silver in gm/cm$^2$/sec where calculated using the following equation:

$$E_i = 10 \exp[(H - (0.5 \log T_i)) - (G/T_i)] \tag{3}$$

Values for G and H were obtained from Duschman, *Scientific Foundations of Vacuum Technique,* Table 10.2, p. 700, as follows:

For lead, G=9710, H=7.69

For silver, G=14270, and H=8.63

Using values of $E_t$ calculated from Equation 3, the hours to evaporation are estimated from Equation 1.

The temperature reductions achievable with the core 70, 70' of the present invention make it favorable to use lead, rather than silver, as a bearing lubrication, providing several advantages in x-ray tube operation, such as reduced torque requirements and lowered noise levels in operation, as compared with a silver lubricant. Preferably, the core 70, 70' reduces the temperature of the forward race 64 by at least 20° C., more preferably, by a temperature of up to about 40° C., or more, over a conventional x-ray tube. X-ray tubes formed with the core of the present invention will show extended tube life due to the increase in the time to failure of the front bearings.

To form the x-ray tube of FIGS. 1 to 4, the core 70 is inserted into the bearing shaft cavity 60 and the weld rims 93, 94 are welded together, or other means employed, such as an end cap, for retaining the core within the shaft cavity. The hub 56 of the shaft is connected to the neck flange with screws, or other suitable fixing members, and the anode 10 is connected with the neck. The bearing balls 44 are positioned between the forward and rear bearing races 64 and 66 and corresponding races on the rotor support 42. Once the x-ray tube has been assembled, it is evacuated to a low pressure and the interior parts, including the anode, and hence the bearing shaft, are heated. Materials evaporating from the parts under the temperature and pressure conditions are withdrawn from the x-ray tube. Much less of the lubricant 46 will evaporate from the bearing balls 44 during this processing step due to the reduced temperature at the front bearing race 64.

Figure 9:
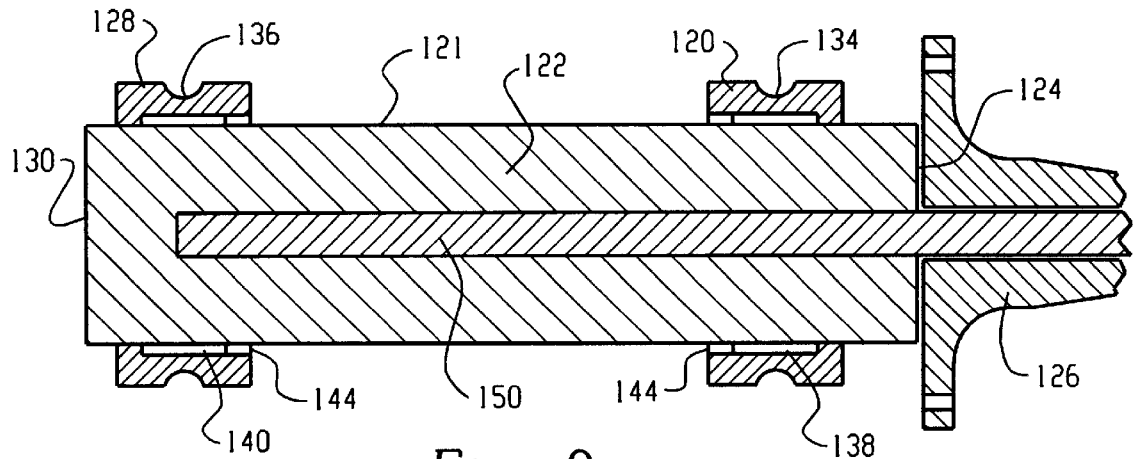
FIG. 9 is a side sectional view of another alternative embodiment of a bearing shaft and neck for an x-ray tube according to the present invention.

With reference now to FIG. 9, in an alternative embodiment, a first, generally cylindrical bearing shaft portion 120 is welded to, or otherwise firmly connected with, an outer cylindrical surface 121 of a thermally conductive core 122 adjacent a forward end 124 thereof. A neck 126 connects the core with the anode of an x-ray tube (not shown) via the forward end 124. A second, generally cylindrical bearing shaft portion 128 is welded to, or otherwise firmly connected with, the conductive core 122 adjacent a rearward end 130 thereof. The first and second bearing shaft portions 120, 128 are formed from a material of low thermal conductivity, such as tool steel. The bearing shaft portions 120, 128 define bearing races 134, 136, respectively, for receiving lubricated bearing balls (not shown). Optionally, the bearing shaft portions each include a groove 138, 140, respectively, which separates the region of the bearing shaft portion which carries the bearing race from the adjacent region of the core. Preferably, the groove is accessible to the x-ray tube chamber 12, so that it is evacuated during evacuation of the chamber. For this purpose a passageway 144 is optionally formed in each of the bearing shaft portions.

Optionally, a support member 150, such as a shaft, extends axially along the core 122, for providing rigidity to the core. The shaft 150 is preferably made from tool steel or other rigid material. The shaft is connected with the anode directly, or with the neck 126.

Without intending to limit the scope of the invention, the following examples show the improvements which may be achieved in bearing race temperature distribution using the cores according to the present invention.

EXAMPLES

Example 1

Comparison of Copper Core with Conventional Solid Shaft

Figures 8A, 8B:
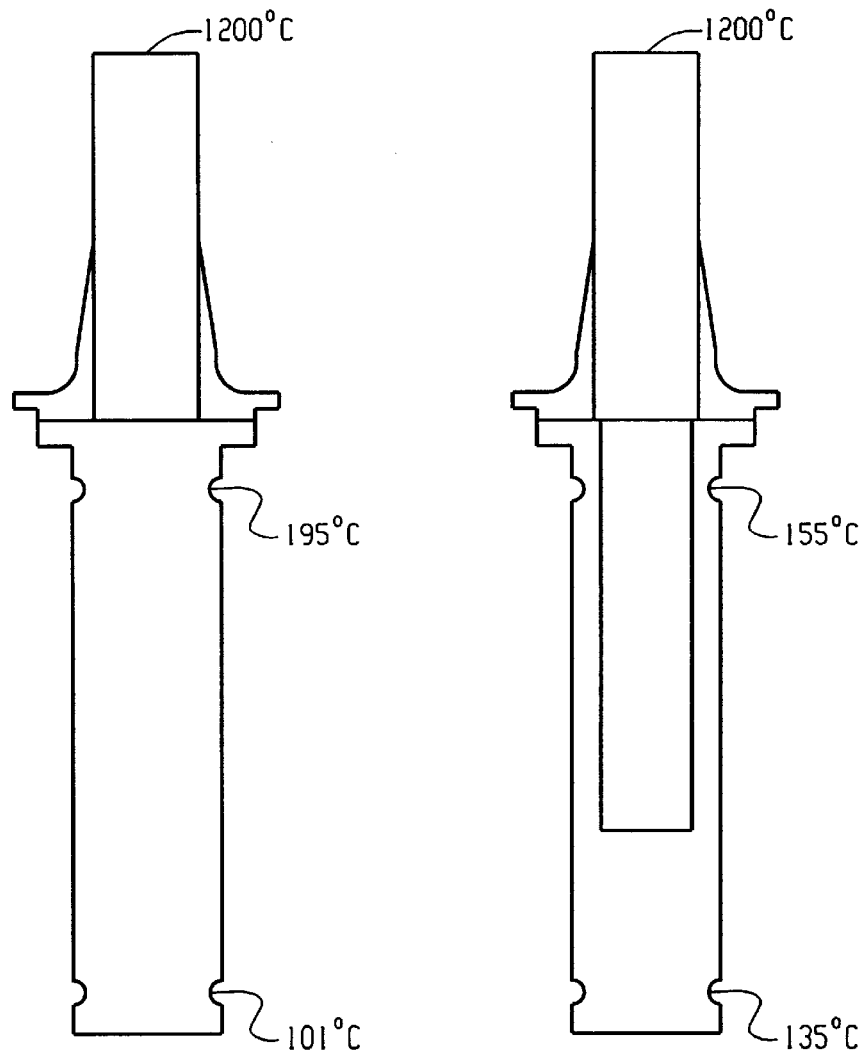
FIG. 8A is a thermal profile of the neck and bearing member of a conventional x-ray tube when heated to 1200° C. at the anode end of the neck.
FIG. 8B is a thermal profile of the neck and bearing member of a tube with a thermally conductive core according to the present invention when heated to 1200° C. at the anode end of the neck.

The effect of a copper core on the bearing race temperatures was determined by comparing the temperature profile of a conventional solid tool steel shaft and the temperature profile of a hollow tool steel shaft 54 and a copper core 70, formed according to the present invention. Each of the shafts was coupled to a neck, as shown in FIG. 8B. The temperatures of the two shafts were determined by computer modeling techniques, using Finite Element Analysis. The forward end of the neck of each was heated to 1200° C. and the temperature profile of the stem and shaft modeled.

With reference to FIGS. 8A and 8B, the temperature profiles of the bearing shafts operated under these conditions show that the front bearing race of the conventional shaft (FIG. 8A) reached 195° C., while the temperature of the rear bearing race reached 101° C. In comparison, the front bearing race of the shaft according to the present invention FIG. 8B) reached 155° C., 40 degrees less than that of the conventional shaft. The temperature of the rear bearing race reached 135° C. which, although higher than that of the conventional rear bearing race, was less than the temperature of the front bearing race. Accordingly, it can be expected that the x-ray tube of the present invention may be run for a longer time than a conventional x-ray tube, before the lubricant evaporates from the bearing races.

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claims or the equivalents thereof.

Having thus described the preferred embodiment, the invention is now claimed to be:

1. An x-ray tube for providing a beam of x-rays, the tube comprising:
    an envelope which defines an evacuated chamber;
    a cathode disposed within the chamber for providing a source of electrons;
    an anode disposed within the chamber which is struck by the electrons and generates x-rays;
    a rotor for rotating the anode relative to the cathode, the rotor including:
        a shaft which defines an interior cavity;
        a forward bearing race and a rear bearing race on the shaft, the forward bearing race being closer to the anode than the rear bearing race;
        a rotor core disposed within the cavity and having a high thermal conductivity such that heat is conducted by the core in a direction away from the anode, a first region of contact being formed between the shaft and the rotor core forward of the forward bearing race and a second region of contact being formed between the shaft and the rotor core intermediate the forward and rear bearing races, the first and second regions being spaced by an insulating region, the first and second contact regions being sized to balance temperatures of the forward and rear bearing races;
        the forward bearing race being of a lower conductivity than the core, such that the core conducts heat past the forward bearing race; and
        lubricated bearings received in the forward and rear bearing races.

2. The x-ray tube of claim 1, wherein the core is welded to the surrounding bearing shaft.

3. The x-ray tube of claim 1, wherein the core is formed from a solid material selected from the group consisting of copper, silver, and beryllium.

4. The x-ray tube of claim 3, wherein the core is formed from copper.

5. The x-ray tube of claim 1, wherein the core reduces the temperature of the forward race during operation of the x-ray tube by at least 20° C., as compared with an x-ray tube having a solid bearing shaft.

6. An x-ray tube for providing a beam of x-rays, the tube comprising:

an envelope which defines an evacuated chamber;

a cathode disposed within the chamber for providing a source of electrons;

an anode disposed within the chamber which is struck by the electrons and generates x-rays;

a rotor for rotating the anode relative to the cathode, the rotor including:

a shaft connected with a stem of the anode by a first end thereof, the shaft defining an interior cavity, forward and rear bearing races being formed on a portion of the shaft in which the cavity is defined, a rotor core received in the interior cavity of the shaft, the core having a high thermal conductivity such that heat is conducted by the core away from the anode, an annular space being defined between the core and the bearing shaft to provide a region of low heat transfer between the core and the bearing shaft such that heat flows between the core and the shaft at a thermal contact region between the core and the shaft adjacent the annular space, the annular space being positioned to increase a path length for heat to travel to reach the forward bearing race; and bearings received in the forward and rear bearing races.

7. The x-ray tube of claim 6 further including a second annular space defined between the core and the bearing shaft to provide a region of low heat transfer between the core and the bearing shaft such that heat flows between the core and the shaft at a thermal contact region adjacent the second annular space, the second annular space being positioned to increase a path length for heat to travel to reach the rear bearing race.

8. The x-ray tube of claim 6, wherein the annular space is defined by a groove in the core adjacent the forward bearing race.

9. The x-ray tube of claim 8, wherein the groove extends rearward of the forward bearing race, such that heat entering the core forwardly of the groove travels along the core rearwardly of the forward bearing race.

10. An x-ray tube comprising:

a housing which defines an evacuated chamber;

a cathode disposed within the evacuated chamber;

an anode disposed within the evacuated chamber;

a bearing shaft which defines forward and rear bearing races and an interior cavity;

a core received within the shaft cavity, the core having a high thermal conductivity such that heat is conducted by the core past the bearing races in a direction away from the anode;

a stem connected between the anode and the bearing shaft, the stem defining an interior vacuum cavity adjacent the core, which spaces the anode from the core, for reducing the direct flow of heat from the stem to the core; and lubricated bearings received in the forward and rear bearing races.

11. The x-ray tube of claim 10, wherein the forward and rear bearing races are defined in a common shaft with an interior cavity therein and wherein the core is formed from a liquid material selected from the group consisting of mercury, gallium, and mixed alloy compositions of tin and at least one of gallium and indium.

12. The x-ray tube of claim 11, wherein the liquid material is sealed within the cavity by an end cap.

13. An x-ray tube for providing a beam of x-rays, the tube comprising:

a housing which defines an evacuated chamber;

an election source disposed within the evacuated chamber;

an anode disposed within the chamber to be struck by accelerated electrons and generate x-rays;

a bearing shaft connected with the anode and having a hollow axial cavity;

a stationary core having a high thermal conductivity, the core being connected with a stationary housing and being spaced from the bearing shaft by a narrow vacuum gap, such that the bearing shaft rotates relative to the core, heat being conducted by the core in a direction away from the anode;

a forward bearing race and a rear bearing race on the bearing shaft, the forward bearing race being closer to the anode than the rear bearing race;

lubricated bearings received between the forward and rear bearing races and corresponding stationarily mounted bearing races.

14. The x-ray tube of claim 13, wherein the cavity is axially aligned with the shaft.

15. A rotor for an x-ray tube, the rotor comprising:

a bearing member including a hollow cylindrical shaft with a closed rearward end formed from a material of a first thermal conductivity, the cylindrical shaft defining forward and rear bearing races on an exterior surface thereof to receive lubricated bearings therein;

a neck, connected with the bearing member adjacent the forward bearing race, to connect the rotor to an anode of the x-ray tube; and an insert, received within the hollow shaft, and formed from a material of a second thermal conductivity, which is higher than the first thermal conductivity, to transport heat away from the forward bearing race and reduce the temperature of the forward bearing race during operation of the x-ray tube.

16. The rotor of claim 15 further including:

an annular insulating region defined between the insert and the hollow shaft adjacent the forward bearing race.

17. A method of reducing evaporation of a bearing lubricant in an x-ray tube having an anode and a rotor assembly connected therewith, the rotor assembly including a hollow bearing shaft which defines a forward bearing race and a rear bearing race, the forward bearing race being closer to the anode than the rear bearing race, the method comprising:

conducting heat around and past the forward bearing race toward the rear bearing race, including:

removing heat from the bearing shaft forward of the forward bearing race, transporting the removed heat through a core disposed in the hollow bearing shaft of greater thermal conductivity than the shaft, and returning heat from the core to the shaft in a region intermediate the first and second bearing races, thereby reducing the temperature of the forward bearing race and reducing a temperature difference between the forward and rear bearing races.

18. The method of claim 17 further including blocking direct transfer of heat between the high thermal conductivity core and the forward bearing race with an insulating region disposed between the core and the forward bearing race.

* * * * *